US010059436B1

(12) United States Patent
Robertson et al.

(10) Patent No.: US 10,059,436 B1
(45) Date of Patent: Aug. 28, 2018

(54) SEALED FLOAT WITH BATTERIES

(71) Applicant: Kitty Hawk Corporation, Mountain View, CA (US)

(72) Inventors: Cameron Robertson, San Mateo, CA (US); Todd Reichert, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/783,898

(22) Filed: Oct. 13, 2017

Related U.S. Application Data

(63) Continuation-in-part of application No. 15/649,293, filed on Jul. 13, 2017, now Pat. No. 9,944,386.

(51) Int. Cl.
    *B64C 25/54* (2006.01)
    *B64C 27/08* (2006.01)
    *B64D 17/80* (2006.01)
    *B64D 27/24* (2006.01)
    *B64C 25/36* (2006.01)
    *B64C 31/028* (2006.01)
    *B64C 25/32* (2006.01)

(52) U.S. Cl.
    CPC ............ *B64C 25/54* (2013.01); *B64C 25/36* (2013.01); *B64C 27/08* (2013.01); *B64D 17/80* (2013.01); *B64D 27/24* (2013.01); *B64C 31/028* (2013.01); *B64C 2025/325* (2013.01)

(58) Field of Classification Search
    CPC ......... B64C 25/54; B64C 25/36; B64C 27/08; B63B 1/10
    See application file for complete search history.

(56) References Cited

U.S. PATENT DOCUMENTS

| 2,196,946 | A | * | 4/1940 | Stone ...................... | B64C 25/54 244/101 |
| 2,465,193 | A | * | 3/1949 | Boyle ..................... | B64C 25/54 244/105 |
| 2,702,171 | A | * | 2/1955 | Katzenberger .......... | B64C 25/54 244/101 |
| 3,507,466 | A | * | 4/1970 | La Fleur ................. | B64C 25/56 244/100 A |
| 3,889,902 | A |   | 6/1975 | Madet | |
| 4,356,787 | A | * | 11/1982 | Harley .................... | B63B 1/20 114/292 |
| 4,799,629 | A |   | 1/1989 | Mori | |
| 4,848,702 | A | * | 7/1989 | Riggins ................... | B64C 25/54 114/283 |

(Continued)

FOREIGN PATENT DOCUMENTS

WO    WO-2015145101    10/2015

OTHER PUBLICATIONS

U.S. Appl. No. 15/249,077 entitled Multicopter With Wide Span Rotor Configuration filed Aug. 26, 2016.

*Primary Examiner* — Christopher P Ellis
(74) *Attorney, Agent, or Firm* — Van Pelt, Yi & James LLP

(57) ABSTRACT

A float has a front-to-back length, a width, and a height where the front-to-back length of the float is strictly greater than the height of the float which in turn is strictly greater than the width of the float. At least a bottom portion of the float is watertight. The float includes an access panel to access the inside of the float. A battery is inside the float and is accessible via the access panel.

10 Claims, 10 Drawing Sheets

(56) References Cited

U.S. PATENT DOCUMENTS

| | | | |
|---|---|---|---|
| 5,277,383 A * | 1/1994 | Tormakhov | B64C 35/00 244/105 |
| 6,254,032 B1 | 7/2001 | Bucher | |
| 6,293,491 B1 | 9/2001 | Wobben | |
| 6,446,910 B1 | 9/2002 | Knoll | |
| 6,592,073 B1 * | 7/2003 | Meekins | B64C 11/001 244/105 |
| 7,159,817 B2 | 1/2007 | Vandermey | |
| 7,188,804 B1 * | 3/2007 | Boetto | B64C 25/10 244/101 |
| 7,263,945 B2 | 9/2007 | Little | |
| 7,699,260 B2 | 4/2010 | Hughey | |
| 9,321,529 B1 | 4/2016 | Jones | |
| 9,457,900 B1 * | 10/2016 | Jones | B64C 39/02 |
| 9,821,906 B1 * | 11/2017 | Roop | B64C 35/001 |
| 9,856,016 B2 | 1/2018 | Mueller | |
| 9,873,486 B2 * | 1/2018 | Jackson | B63B 1/121 |
| 9,944,386 B1 | 4/2018 | Reichert | |
| 2002/0125368 A1 | 9/2002 | Phelps | |
| 2003/0164424 A1 * | 9/2003 | Smith | B64C 25/12 244/105 |
| 2006/0266881 A1 | 11/2006 | Hughey | |
| 2008/0302908 A1 * | 12/2008 | Filipek | B63B 39/061 244/105 |
| 2009/0008499 A1 | 1/2009 | Shaw | |
| 2010/0032522 A1 * | 2/2010 | Zadini | B63H 11/04 244/105 |
| 2010/0044506 A1 * | 2/2010 | Smith | B64C 25/10 244/101 |
| 2010/0066158 A1 * | 3/2010 | Hamilton | B60B 3/08 301/109 |
| 2011/0226892 A1 | 9/2011 | Crowther | |
| 2011/0248118 A1 * | 10/2011 | Meekins | B64C 25/54 244/101 |
| 2012/0083945 A1 | 4/2012 | Oakley | |
| 2013/0075538 A1 * | 3/2013 | Wiplinger | B64C 25/54 244/218 |
| 2013/0105628 A1 | 5/2013 | Buscher | |
| 2013/0174768 A1 * | 7/2013 | von der Goltz | B63B 35/73 114/66 |
| 2014/0252165 A1 * | 9/2014 | Smith | B64C 25/54 244/105 |
| 2014/0261126 A1 * | 9/2014 | Jenkins | B63B 9/02 114/39.23 |
| 2015/0012154 A1 | 1/2015 | Senkel | |
| 2015/0217862 A1 * | 8/2015 | Dijaux | B64C 25/54 244/105 |
| 2015/0314831 A1 * | 11/2015 | Jackson | B63B 1/121 440/6 |
| 2016/0032895 A1 | 2/2016 | Weddendorf | |
| 2016/0059958 A1 | 3/2016 | Kvitnevskiy | |
| 2016/0207368 A1 | 7/2016 | Gaonjur | |
| 2016/0207625 A1 | 7/2016 | Judas | |
| 2016/0311526 A1 | 10/2016 | Geise | |
| 2016/0375982 A1 | 12/2016 | Rifenburgh | |
| 2017/0043866 A1 * | 2/2017 | Sakurai | B63B 1/22 |
| 2017/0158342 A1 | 6/2017 | Ishii | |
| 2017/0174335 A1 | 6/2017 | Malloy | |
| 2017/0183088 A1 | 6/2017 | Du | |
| 2017/0197710 A1 | 7/2017 | Ma | |
| 2017/0199527 A1 | 7/2017 | Chandra | |
| 2017/0210486 A1 | 7/2017 | O'Brien | |
| 2017/0247107 A1 | 8/2017 | Hauer | |
| 2017/0247113 A1 | 8/2017 | Sanlaville | |
| 2017/0253331 A1 | 9/2017 | Nakashima | |
| 2017/0253333 A1 * | 9/2017 | Baudet | B64C 39/024 |
| 2017/0269609 A1 | 9/2017 | Bradlow | |
| 2017/0283048 A1 | 10/2017 | Beckman | |
| 2018/0002001 A1 | 1/2018 | Daniel, Sr. | |
| 2018/0057152 A1 | 3/2018 | Reichert | |
| 2018/0117980 A1 | 5/2018 | Lacaze | |

* cited by examiner

SEALED FLOAT WITH BATTERIES

CROSS REFERENCE TO OTHER APPLICATIONS

This application is a continuation in part of co-pending U.S. patent application Ser. No. 15/649,293 entitled MULTICOPTER WITH WIDE SPAN ROTOR CONFIGURATION AND PROTECTIVE FUSELAGE filed Jul. 13, 2017, which is incorporated herein by reference for all purposes.

BACKGROUND OF THE INVENTION

New types of aircraft are being developed for new applications and/or environments. New components for use in these new types of aircraft which satisfy new combinations of design goals and/or objectives (e.g., which previously did not have to be satisfied but now do because of the new applications and/or environments) would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a multicopter with a wide span rotor configuration and protective fuselage, as well as embodiments of a float which can be used with such a multicopter, are described herein. In some embodiments, the system includes a float which has a front-to-back length, a width, and a height where the front-to-back length of the float is strictly greater than the height of the float which in turn is strictly greater than the width of the float. At least a bottom portion of the float is watertight. The float includes an access panel to access the inside of the float. A battery is inside the float and is accessible via the access panel. First, various embodiments of the multicopter are described. Then, various float embodiments (e.g., including various features which the float may include) are described. It is noted that the floats described herein may be used with other types of aircraft and the multicopter described herein is merely exemplary.

Figure 1:
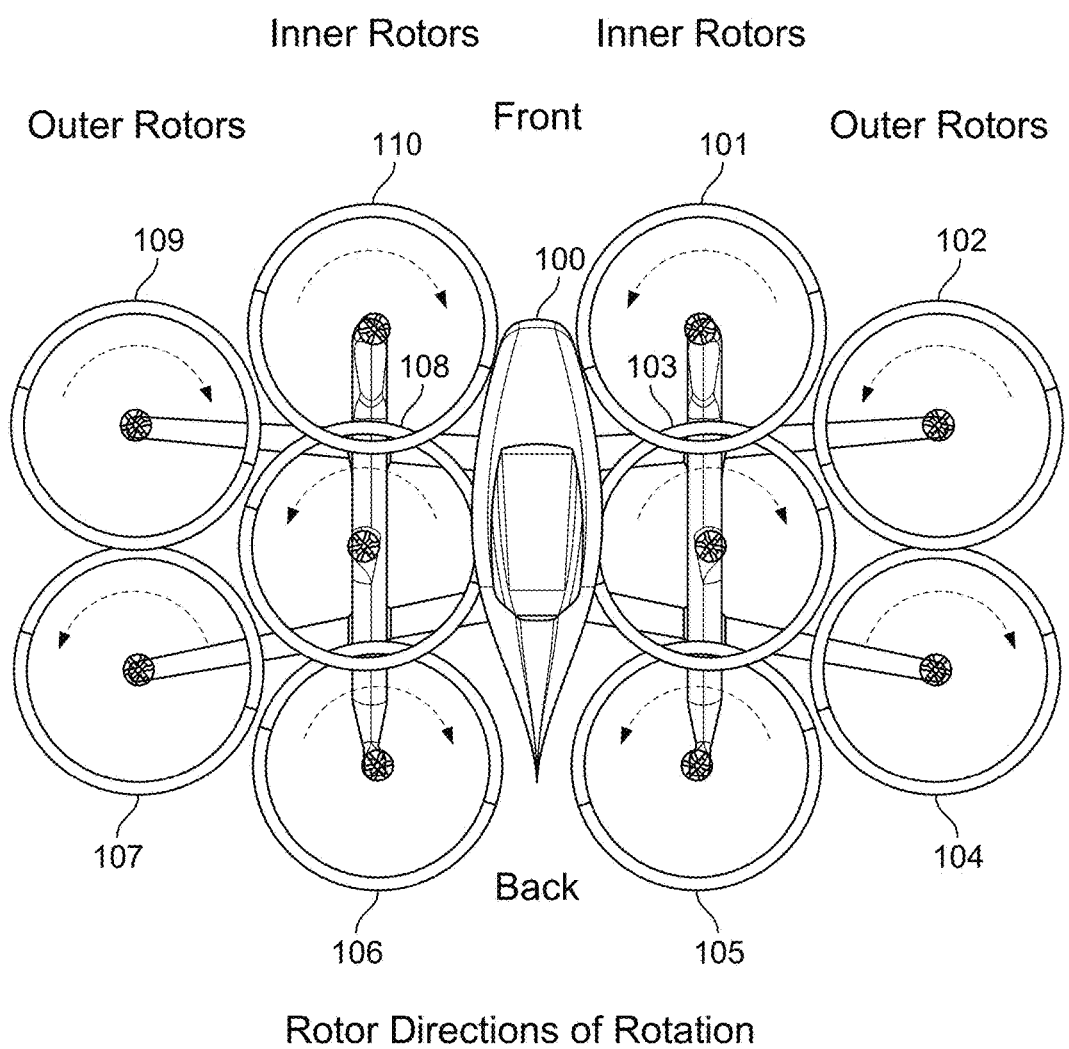
FIG. 1 is a diagram illustrating an embodiment of rotor directions of rotation in a multicopter.

FIG. 1 is a diagram illustrating an embodiment of rotor directions of rotation in a multicopter. In this example, a multicopter with 10 rotors is shown with 5 rotors each on the left (port) side and right (starboard) side of the multicopter. Inner rotors 101, 103, 105, 106, 108, and 110 are located adjacent to the fuselage (100). Outer rotors 102, 104, 107, and 109 are separated from the fuselage (100) by the inner rotors. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

In this example, the inner rotors (101, 103, 105, 106, 108, and 110) overlap with their neighboring or adjacent inner rotor(s). For example, inner rotor 106 overlaps with (and rotates below) inner rotor 108, which in turn overlaps with (and rotates below) inner rotor 110. Similarly, on the other side, inner rotor 105 overlaps with (and rotates below) inner rotor 103, which in turn overlaps with (and rotates below) inner rotor 101. As will be described in more detail below, to achieve the overlaps shown, the rotors are tilted at various angles and/or are placed at different heights in this example.

In some embodiments, having the inner rotors overlap with each other (one example of which is shown here) is attractive because it permits a smaller, more compact footprint of the multicopter than if the inner rotors did not overlap. A smaller footprint may be desirable because the multicopter takes up less space for transport or when parked, and/or a smaller safety zone is required when taking off or landing. Also, the weight can be reduced with a smaller airframe, which is desirable since less power is required to fly the aircraft and/or the range can be extended. The tradeoff with overlapping rotors is that they may interfere with each other aerodynamically (e.g., the airflow from one rotor interferes with another rotor) but this impact may be relatively small and/or acceptable given the benefits of a smaller footprint. For example, the overlap between inner rotors shown here is relatively small and so the interference may be negligible.

In some embodiments, a multicopter is sized so that it can fit into a trailer or on a flatbed and be towed. For example, because the wingspan is wider than the nose-to-tail length of the multicopter, the exemplary multicopter may be fit into an enclosed trailer or on an open flatbed trailer sideways. By having the inner rotors overlap, this makes it easier to fit the multicopter into standard-sized trailers.

Using ten rotors as shown here may be attractive for a variety of reasons. For example, ten rotors maximize the multicopter's disc area within a desired overall size (e.g., the desire to fit the multicopter into or on a standard-width trailer). Using ten rotors also helps with redundancy because it permits the multicopter to maintain flight and possibly allow for some degree of flight precision even if there is rotor failure. It is noted that a rotor failure may require power to be cut to a rotor opposite to the failed rotor for symmetry and ease of flight.

In this example, the outer rotors do not overlap with their adjacent or neighboring inner rotors. For example, outer rotor 109 (102) does not overlap with inner rotor 110 (101) nor with inner rotor 108 (103). Similarly, outer rotor 107 (104) does not overlap with inner rotor 108 (103) nor with inner rotor 106 (105). However, the outer rotors do overlap with each other (e.g., outer rotor 109 (102) overlaps with outer rotor 107 (104)). Having some separation between an outer rotor and adjacent inner rotors (i.e., no overlap) may be desirable because the outer rotors are more susceptible to larger vibrations and/or bouncing. For example, because the outer rotors are located at the distal ends of the arms (sometimes referred to as booms) which extend outward from the fuselage, the outer rotors will vibrate or bounce up and down more than the inner rotors will. The inner rotors are also mounted to the floats (e.g., which run from front to back) which further dampen any vibrations or bouncing, whereas the outer rotors are not mounted to the floats. This larger vertical displacement of the outer rotors could cause an inner rotor and outer rotor to collide which could damage the rotors. To avoid this, there is no overlap between the outer rotors and the inner rotors in this configuration. Although not shown here, in some embodiments, the two outer rotors on a given side (e.g., rotor 107 and rotor 109, or rotor 104 and rotor 102) do not overlap for this reason (e.g., to avoid a potential collision).

The position or placement of the outer rotors is selected so that the outer rotors are packed fairly efficiently and/or tightly next to the two adjacent inner rotors. For example, outer rotor 109 sits in the "V" created by inner rotor 110 and inner rotor 108. This arrangement packs the rotors in an efficient and/or tight manner which in turn reduces the footprint of the multicopter.

This diagram also illustrates the directions of rotation of the various rotors. In this example, rotors 103, 104, 106, 109, and 110 rotate in a clockwise direction when viewed from above. Rotors 101, 102, 105, 107, and 108 rotate in a counterclockwise direction when viewed from above. Or, to put it another way, rotors 101, 102, 105, 106, 109, and 110 rotate towards the fuselage and rotors 103, 104, 107, and 108 rotate away from the fuselage.

It is noted that all of the rotors in a particular column (e.g., going from the front of the multicopter to the rear of the multicopter) have alternating directions of rotation. For example, in the leftmost column shown, rotor 109 and rotor 107 have alternating directions of rotation. Similarly, in the second column from the left, rotor 110 rotates in a clockwise direction, rotor 108 rotates in a counterclockwise direction, and rotor 106 rotates in a clockwise direction. This alternation of rotational direction may enable the multicopter to fly more efficiently. A rotor creates lift when the blade is traveling against the direction of wind and does not create lift when it spins in the direction of wind. By stacking up alternating rotors one behind the next in the direction of flight (e.g., typically forwards), the multicopter may experience a consistent amount of lift and/or decrease intervals of decreased lift.

TABLE 1

Directions of rotation for the exemplary rotors shown in FIG. 1

| Rotor | Direction of Rotation (viewed from above) |
|---|---|
| Right Inner Front Rotor (101) | Counterclockwise |
| Right Outer Front Rotor (102) | Counterclockwise |
| Right Inner Middle Rotor (103) | Clockwise |
| Right Outer Back Rotor (104) | Clockwise |
| Right Inner Back Rotor (105) | Counterclockwise |
| Left Inner Back Rotor (106) | Clockwise |
| Left Outer Back Rotor (107) | Counterclockwise |
| Left Inner Middle Rotor (108) | Counterclockwise |
| Left Outer Front Rotor (109) | Clockwise |
| Left Inner Front Rotor (110) | Clockwise |

The directions of rotations shown here are selected based on a variety of factors. In some embodiments, rotors that are opposite to each other on the aircraft (e.g., where fuselage 100 acts as an axis of symmetry) may rotate in opposing directions to balance torque. For example, rotor 101 and rotor 110 are opposite to each other and rotate in opposite directions to counter the other's torque.

To illustrate the area occupied by the rotors when the rotors are on, the rotors are shown here as a circle and the number of blades is not shown. In some embodiments, a rotor has two blades and the rotors have a diameter of ~50 inches. A diameter of this size may correspond to the largest diameter possible for a 10 rotor configuration within the constraints of the desired multicopter dimensions (e.g., fit into a standard sized trailer).

It may be helpful to describe how the exemplary multicopter can be flown, beginning with how the pilot gets into the multicopter. In some cases, the multicopter will be floating on water and the pilot will get into the seat in the fuselage by walking on the arms (booms), floats, and/or fuselage of the multicopter as needed. The rotors will be off at this time, and the pilot will be in no danger from the rotors when getting into the multicopter.

Once in the multicopter, the pilot may decide to steer (e.g., while floating on the water) the multicopter away from the boarding point to some takeoff location away from bystanders and/or other multicopters. In some embodiments, to do this, only the inner middle rotors are turned on and used to maneuver the multicopter to the desired takeoff location. For example, since rotor 103 and rotor 108 are shielded by other rotors, it will be harder for those rotors to hit any bystanders even if they are on. In some embodiments, only rotors 103 and 108 (i.e., the unexposed rotors) are used to maneuver the multicopter around to protect bystanders. Alternatively, the outer rotors (102, 104, 107, and 109) may be turned off and only the inner rotors (101, 103, 105, 106, 108, and 110) are used in some embodiments to maneuver the aircraft when on the water. Although this may pose more of a risk, it may be easier and/or more efficient to maneuver the aircraft using more rotors. In some embodiments, a multicopter has wheels and the multicopter is able to maneuver on the ground in this manner (e.g., using only shielded rotors or the inner rotors for safety).

Once the multicopter reaches the desired takeoff location, the multicopter performs a substantially vertical takeoff. Once a desired altitude is reached, the pilot may rotate (e.g., while hovering at the same altitude) the multicopter about a vertical or yaw axis (not shown here) so that the multicopter is facing or pointing in some desired direction (e.g., toward a desired destination). The multicopter then flies forward, maintaining a constant altitude until the multicopter approaches a desired landing site (e.g., over water or on land). The pilot may slow the forward movement of the multicopter, coming to a forward stop generally above the desired landing site while still hovering and maintaining a constant altitude. The multicopter then descends vertically. If needed, the pilot may stop the vertical descent and (if desired) move the multicopter laterally left or right (e.g., while maintaining a constant altitude) in order to avoid objects on the ground and/or to better align the multicopter over the desired landing site. Similarly, during the vertical landing, the pilot may stop the vertical descent and (if desired) rotate the multicopter about the vertical or yaw axis so that the multicopter is facing in some desired direction and/or to make it easier to shift left or right in order to land on the desired landing site.

Each of the rotors is attached in a fixed manner to the exemplary multicopter with some fixed roll angle and fixed pitch angle. The following figure shows an example of this.

Figure 2:
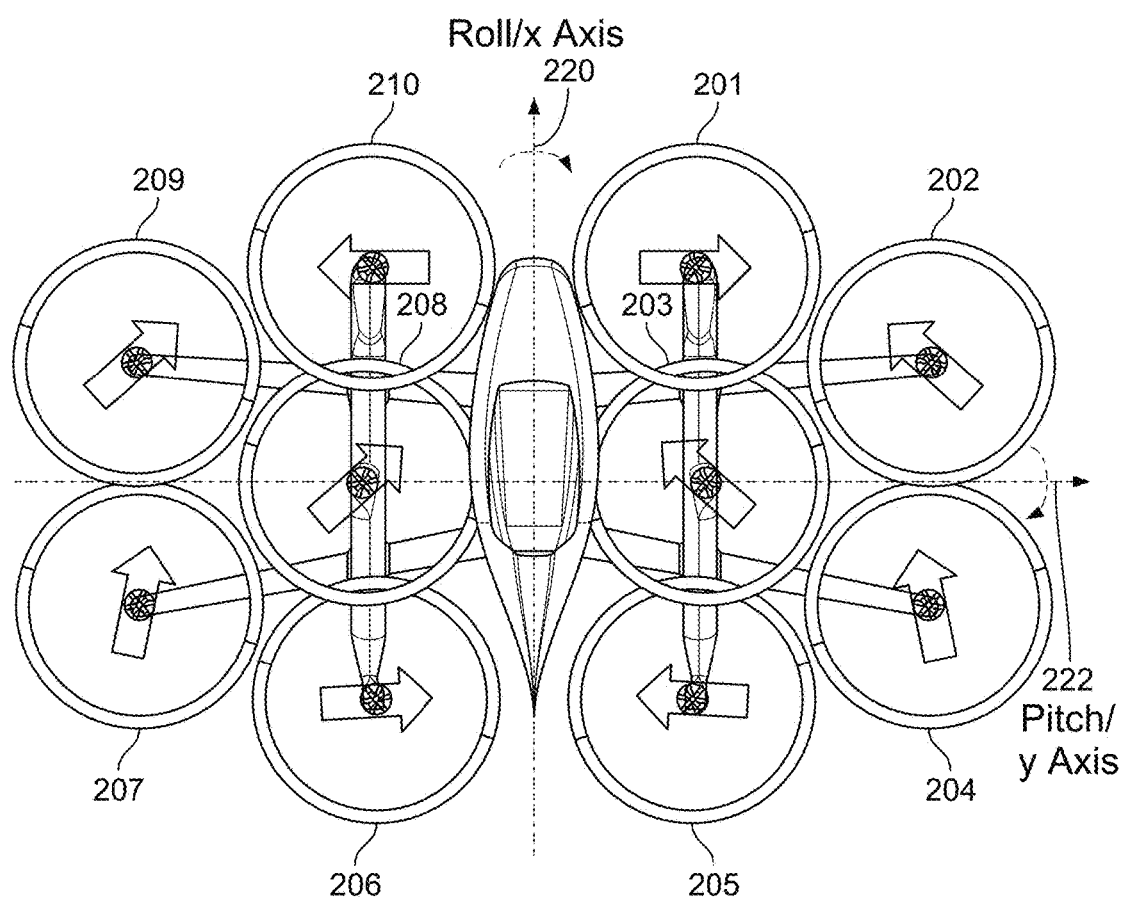
FIG. 2 is a diagram illustrating an embodiment of the fixed tilt positions of the rotors in a multicopter.

FIG. 2 is a diagram illustrating an embodiment of the fixed tilt positions of the rotors in a multicopter. In this example, each rotor's tilt position is described using two angles: a roll angle and a pitch angle. The roll angle is defined by the roll axis (220), sometimes referred to as an x-axis, where a positive roll angle follows the right-hand direction of rotation (see, for example, the curved arrow about roll axis 220) and a negative roll angle is in the opposite direction. Similarly, the pitch angle for each rotor is defined by the pitch axis (222), sometimes referred to as a y-axis, where a positive pitch angle follows the right-hand direction of rotation (see, for example, the curved arrow about pitch axis 222) and a negative pitch angle is in the opposite direction.

The following table lists the roll angle and pitch angle for each rotor in this example. It is noted that opposite rotors (e.g., where the fuselage acts as an axis of symmetry) have roll angles of the same magnitude but opposite signs (e.g., rotor 210 has a roll angle of −3° and rotor 201 has a roll angle of 3°) and the same pitch angle (e.g., both rotor 210 and rotor 201 have pitch angles of 0°). Generally speaking, the roll angles and pitch angles have magnitudes within the range of 0 degrees and 10 degrees.

TABLE 2

Tilt positions for the exemplary rotors shown in FIG. 2

| Rotor | Roll Angle (in degrees) | Pitch Angle (in degrees) |
|---|---|---|
| Right Inner Front Rotor (201) | 3.0 | 0.0 |
| Right Outer Front Rotor (202) | −2.0 | −3.0 |
| Right Inner Middle Rotor (203) | −4.0 | −9.0 |
| Right Outer Back Rotor (204) | −2.0 | −10.0 |
| Right Inner Back Rotor (205) | −7.0 | −2.0 |
| Left Inner Back Rotor (206) | 7.0 | −2.0 |

TABLE 2-continued

Tilt positions for the exemplary rotors shown in FIG. 2

| Rotor | Roll Angle (in degrees) | Pitch Angle (in degrees) |
|---|---|---|
| Left Outer Back Rotor (207) | 2.0 | −10.0 |
| Left Inner Middle Rotor (208) | 4.0 | −9.0 |
| Left Outer Front Rotor (209) | 2.0 | −3.0 |
| Left Inner Front Rotor (210) | −3.0 | 0.0 |

For convenience, an arrow is shown over each rotor which gives a general or rough sense of each rotor's tilt position For example, if each rotor is conceptually thought of as a plane, a hypothetical ball placed on that plane would roll (e.g., generally or roughly) in the direction of the arrow shown. In general, all of the rotors are tilted slightly forward, with the inner middle rotors (203 and 208) more so.

There are a number of benefits associated with the tilt positions shown in this example. First, all of the rotors have a slight (e.g., ~5 degrees) forward bias so that when the aircraft is flying forwards, the body of the aircraft remains level. Also, the tilt positions of the rotors angles are selected to maximize the aircraft's ability to yaw while minimizing the impact of losing any single rotor. The more a rotor is tilted, the more it contributes to yawing the vehicle when it is sped up or down.

The rotors are mounted to the multicopter (e.g., more specifically, to the floats for the inner rotors and to the arms (booms) for the outer rotors) in a fixed manner at the roll angles and pitch angles shown. In other words, the rotors cannot change their tilt positions from the positions shown. To maneuver, each rotor is independently controllable (e.g., different amounts of torque can be applied to each rotor), such that each rotor can rotate at a different speed or output a different amount of thrust.

The various tilt positions shown here enable the multicopter to maneuver more efficiently compared to some other multicopter designs. For example, consider another multicopter where the rotors only tilt forward or backward to some degree (i.e., all of the rotors have a roll angle of 0°). To move sideways (e.g., left or right), such a multicopter may have to expend more power because none of the rotors have a non-zero roll angle which would help to move the multicopter laterally to the left or right. In contrast, the multicopter shown here can move sideways in a more efficient manner because the rotors have non-zero roll angles. For example, to move laterally to the right, more torque would be applied to rotors 206-209, which would create a thrust differential and move the multicopter to the right. Since rotors 206-209 have positive roll angles (e.g., the tops of those rotors are tilted inward toward the fuselage), some of their overall thrust becomes lateral thrust and some becomes vertical thrust. That is, the positive roll angles of rotors 206-209 more efficiently generate lateral thrust and movement to the right compared to rotors with roll angles of 0.

The following figure shows front and side views of the exemplary multicopter and discusses some landing and safety features.

Figure 3:
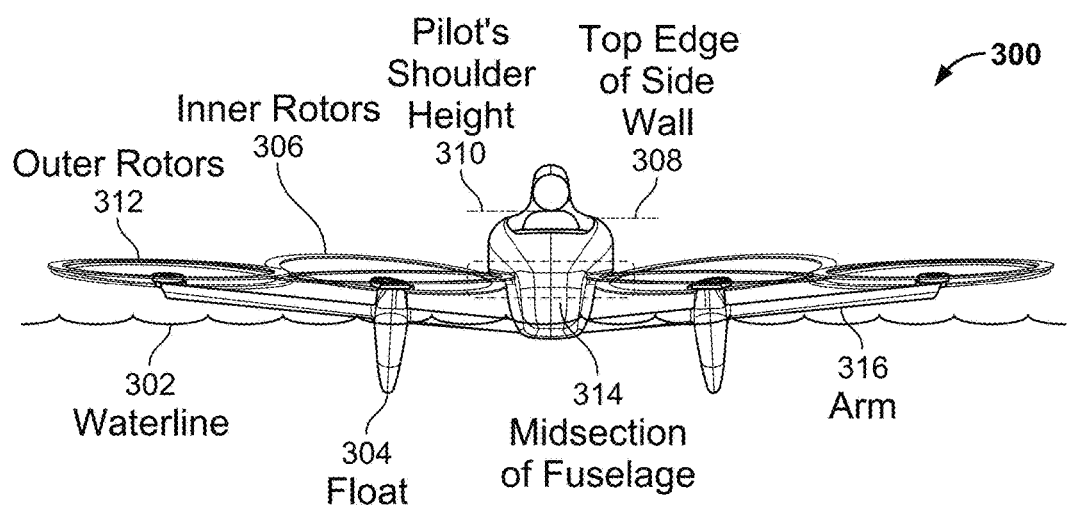
FIG. 3 is a diagram illustrating a front view and a side view of a multicopter embodiment.
Figure 3:
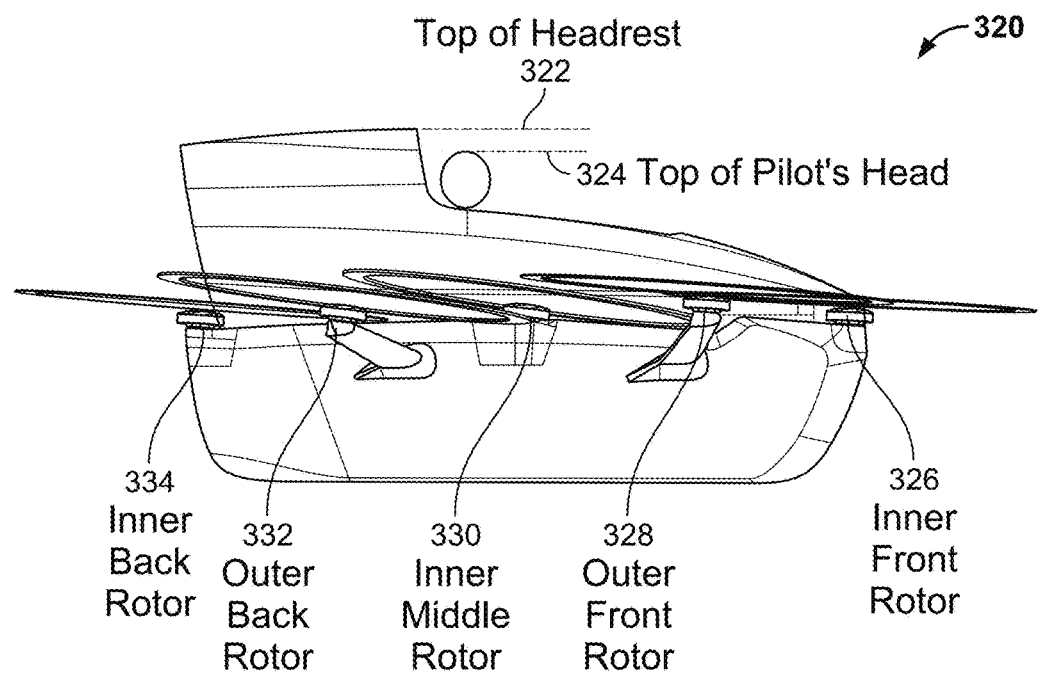

FIG. 3 is a diagram illustrating a front view and a side view of a multicopter embodiment. In the example shown, diagram 300 shows a front view of the exemplary multicopter. This multicopter is capable of taking off and landing on a variety of surfaces, including water and land (not shown here). Waterline 302 shows an example of how high the water is expected to come up to on the multicopter when the multicopter is floating on the surface of the water (e.g., with the rotors off).

From the front view shown in diagram 300, floats (304) are visible. The floats serve a number of functions or purposes. One function they serve is to displace water which generates buoyancy and enables the multicopter to float (e.g., when the rotors are off and are not providing lift). The inner rotors (306) are mounted to the top of the floats (304). Structurally, this helps to stabilize the inner rotors (e.g., since the float is more substantial than the arms (booms) to which the outer rotors (312) are attached) and reduces vibrations and/or bouncing experienced by the inner rotors. As will be described in more detail below, the floats are also used to store the batteries which power the rotors.

The dimensions of the float in this example are dictated and/or set in order to satisfy various design goals and/or objectives. As diagram 300 shows, from the front view, the floats look like air foils where the floats (e.g., observed from the front) are relatively narrow. This reduces drag when the multicopter is flying forwards. Also, because the inner rotors are mounted to the floats, there is a significant amount of downdraft from the inner rotors on the floats, so the floats also act as airfoils when viewed from above. The relatively thin width of the floats minimizes the downward force on the multicopter from the inner rotors' downdraft.

The length (e.g., from front to back) of the floats is dictated by the diameter of the three inner rotors and the amount of overlap between the inner rotors in this example. That is, the length of the float is roughly the shortest length which can fit the three inner rotors with the desired amount of overlap and not substantially more than that.

Since the floats also have to displace enough water to provide sufficient buoyancy for the multicopter to float, the remaining dimension (in this case, the height of the floats) is selected to enable that. To put it another way, since drag and downdraft considerations substantially limit the width of the floats and the length of the floats is substantially dictated by the diameter and packing of the inner rotors, that only leaves the height of the rotors which can be adjusted or otherwise set to provide sufficient buoyancy. It is noted that in this example, part of the fuselage is submerged when the aircraft is floating so that the floats do not need to provide all of the necessary buoyancy for the aircraft to float; this is accounted for in the selection of the float height.

In some embodiments, the floats are filled with air (e.g., in addition to any batteries or other components which are located in the floats) to help with buoyancy. In some embodiments, the floats have bottoms made of a thick and/or robust material so that the multicopter can land on rough terrain or surfaces other than water. In some embodiments, the bottoms of the floats are curved. This may be desirable for water landings because it increases stability during water landings.

The front view shown in diagram 300 also illustrates a number of safety features associated with the fuselage. First, with respect to the pilot, the top edge of the fuselage's side wall (308) is at substantially the same height as the pilot's shoulder (310) when the pilot is seated. The high side walls (e.g., relative to the pilot's seated position) help to protect the pilot's arms when the rotors of the multicopter are rotating and the pilot is seated. To touch the spinning inner rotors, the pilot's arms would have to go over the side wall, and even very long limbed people will not be able to touch the inner rotors while seated due to the tall side walls. In contrast, if the side walls were lower (e.g., at waist or stomach height), it would be easier for a pilot to reach over and touch a spinning inner rotor.

Another safety feature of the fuselage relates to the position and/or shape of the fuselage, relative to the rotors. If a rotor were to break into pieces while rotating (e.g., turning the rotor pieces into projectiles), the projectiles can actually project at a non-zero angle, causing the debris to leave the plane of rotation. In this example, the side wall's height is selected to accommodate for this, for example, based on testing to determine a range of angles (e.g., from the plane of rotation) any projectiles are likely to be projected at if a rotor were damaged. For example, based on testing and/or simulation, heavier and faster moving particles do not tend to go more than ±5 degrees from the plane of rotation when they break apart. This means that the exposed part of the pilot (e.g., above the top edge of the side walls) should not be near the rotors' plane(s) of rotation plus some angle of projection. For this reason, a tall side wall is again useful.

The fuselage is also elevated relative to the rotors to further separate the top edge of the side wall (308) from the plane(s) in which the rotors rotate. With the multicopter configuration shown here, a rotor projectile would hit the fuselage near the midsection of the fuselage (314), not near the top edge of the side wall (308) where the pilot is exposed. In some embodiments, the midsection of the fuselage (e.g., where a projectile from a broken rotor might hit) is reinforced or otherwise designed to protect the pilot should a blade or rotor strike the fuselage.

Returning briefly to the tilt positions shown in Table 2, at least some of the rotors are also tilted in a way that reduces the likelihood of a pilot getting struck by a broken rotor. Note that almost all of the rotors (e.g., except for rotors 201 and 210) have pitch angle signs (e.g., positive or negative) which mean that the rotors are mounted such that the top of each rotor tilts inward toward the fuselage. Returning to diagram 300 in FIG. 3, this means a rotor projectile would go downward (e.g., away from the pilot) as opposed to upward (e.g., toward the pilot). Thus, the tilt positions of at least some of the rotors also help to protect the pilot.

Returning to diagram 320 in FIG. 3, the elevated position of the fuselage (e.g., where the bottom of the fuselage is connected to the arms/booms (316) of the multicopter) may also be desirable because of the separation between the bottom of the fuselage and the ground. This separation between the fuselage and the ground permits the multicopter to land on uneven and/or rocky ground where a rock or protrusion might otherwise damage a lower-hanging fuselage.

At the midsection (314), the fuselage narrows inward (e.g., the side wall includes a top panel which runs vertically, a middle panel which runs (e.g., inwards) horizontally, and a bottom panel which runs vertically) so that the bottom portion of the fuselage is narrower than the top portion of the fuselage. The wider top enables the pilot to more easily enter and exit the multicopter and more comfortably sit in the multicopter. For example, although not shown here, the inside of the fuselage may have arm rests. These arm rests may be located above and/or formed by the narrowing of the fuselage at the midsection (314).

The narrower bottom of the fuselage permits the inner rotors to be closer to the center of the multicopter, which reduces the span (width) of the multicopter. Note, for example, that the narrowing of the fuselage at the midsection (314) creates an overhang beneath which the tips of the inner rotors (306) spin. This permits the rotors to be squeezed in more tightly and for the span (width) of the multicopter to be smaller than if the fuselage were the same width from top to bottom. The narrowing shape also has weight advantages.

Although not shown here, in some embodiments, the seat of a multicopter includes a seatbelt for strapping in a pilot (e.g., in a recumbent and/or seated position). When the rotors are spinning, the seatbelt may help to prevent the pilot from touching the spinning rotors. Also, during a crash or rollover, a seatbelt may keep the pilot safer.

Diagram 320 shows a side view of the multicopter. As shown here, the top of the headrest (322) is higher than the top of the pilot's head (324) when the pilot is seated. The headrest is protective and reinforced so that if the multicopter flips and/or rolls, the headrest protects the pilot's head from being crushed. In some embodiments, the headrest is reinforced by being part of a roll cage or other protective frame which extends throughout the fuselage to prevent the fuselage from collapsing inward and crushing additional body parts, such as the pilot's arms, torso, and legs.

The side view shown in diagram 320 also illustrates the different rotor heights (which generally speaking are within the range of 45 cm-55 cm off the ground) which help to achieve (e.g., in combination with the various tilt positions of the rotors) the rotor overlaps shown in FIG. 1 and FIG. 2.

TABLE 3

Relative heights of the exemplary rotors shown in FIG. 3

| Rotor | Height |
|---|---|
| Inner Front Rotor (326) | 48 cm |
| Outer Front Rotor (328) | 52 cm |
| Inner Middle Rotor (330) | 48 cm |
| Outer Back Rotor (332) | 53 cm |
| Inner Back Rotor (334) | 50 cm |

To address height differences in pilots, a variety of techniques may be used. In some embodiments, the seat is adjustable so that it can be raised or lowered depending upon the pilot's height. For example, a shorter pilot may not be able to see over the side wall or front wall and an adjustable seat would be raised. Conversely, an adjustable seat may be lowered for a taller pilot so that a taller pilot's head remains below the top of the headrest and/or their shoulder is substantially the same height as the top edge of the side wall. Other techniques, including booster seats for shorter pilots or swappable/removable seats, may also be employed.

The multicopter shown here is merely exemplary and is not intended to be limiting. For example, this multicopter does not have a windshield but other embodiments may include a windshield for comfort and/or protection. In some embodiments, the windshield is also used as a heads up display. In some embodiments, the cockpit is enclosed so that the pilot is protected from all sides or angles.

Figure 4:
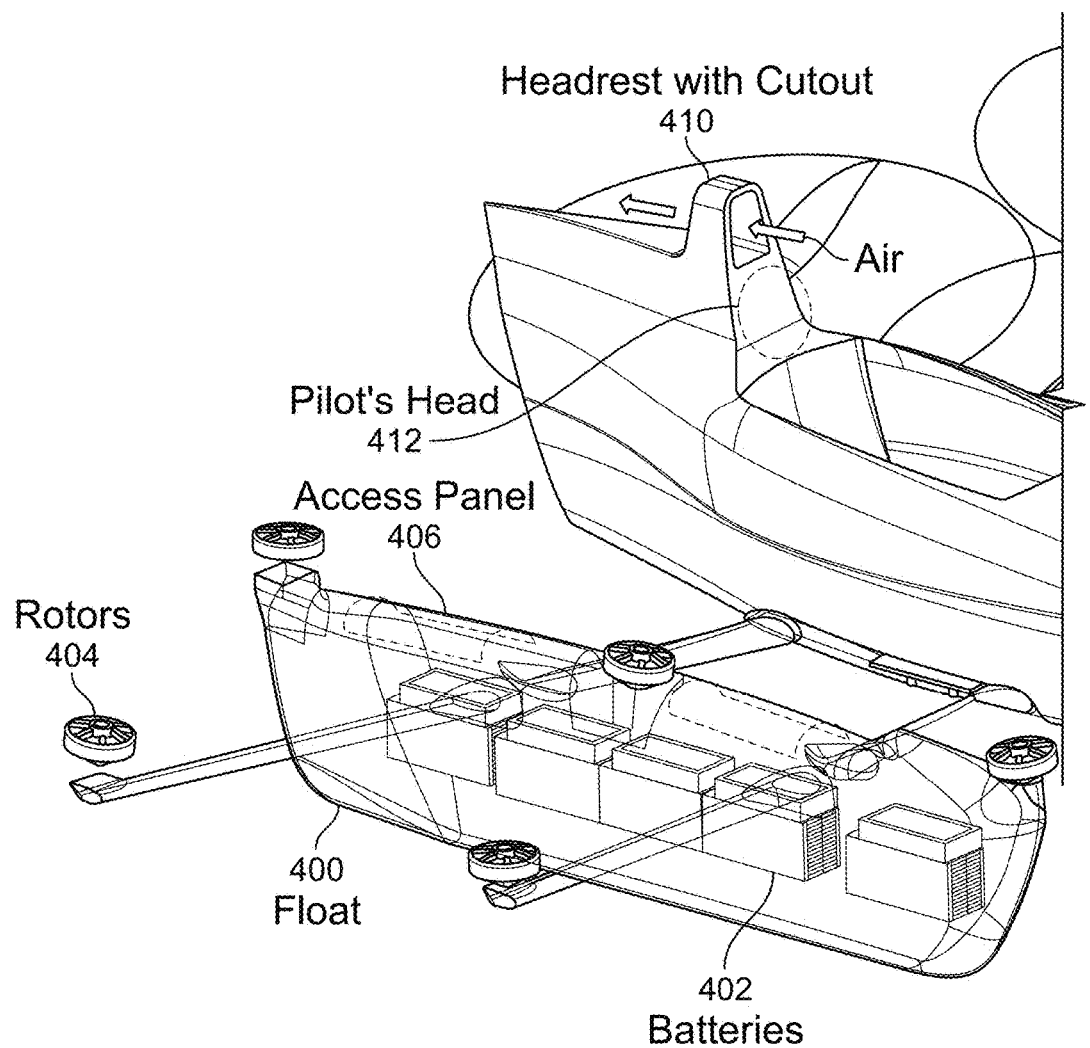
FIG. 4 is a diagram illustrating an embodiment of a float which includes batteries and a headrest with a cutout.

FIG. 4 is a diagram illustrating an embodiment of a float which includes batteries and a headrest with a cutout. For clarity, the blades of the rotors on this side of the multicopter are not shown. In this example, the float (400) includes 5 batteries (402), one for each rotor on this side of the multicopter. By having an independent battery for each rotor (404), multiple rotors will not fail if a single battery goes out.

Storing the batteries in the float may be desirable for safety reasons. In the event of a hard landing (assuming the aircraft does not flip over), the batteries will strike the ground before the pilot will, absorbing much of the kinetic energy of the impact and reducing impact force on the pilot. Similarly, in the event of a rollover, the batteries in the floats help to absorb energy to protect the pilot. For example, as the batteries decelerate, some of the structure in the floats is broken and/or sacrificed in order to protect the pilot.

In some embodiments, the float (400) is carbon based (e.g., carbon fiber), which is relatively lightweight and permits a desired shape to be achieved. For example, if the floats were instead made of an inflatable material, it would be more difficult to achieve the desired (e.g., air foil) shape described above. Carbon related materials therefore can achieve the desired shape, while having sufficient or adequate thermal conductivity to dissipate the heat from the batteries (e.g., because the floats must have a variety of properties, including the ability to dissipate heat from the batteries so that the batteries do not overheat). In some embodiments, to help with thermal conductivity, the walls of the float are kept relatively thin (e.g., thick enough to achieve some desired structural performance, but thin enough to sufficiently dissipate heat).

Placing the batteries in the float also keeps the pilot safe in the event the batteries fail and/or overheat. Some other aircraft configurations may place the batteries under the pilot's seat, which is dangerous because a battery failure can include the battery catching on fire, emitting noxious fumes, and/or exploding. Even a battery which becomes hot but does not fail could be uncomfortable for the pilot.

To access the batteries and other components inside the float, the float has two access panels (406) on the top surface of the float. During normal operation when access to the interior of the floats is not needed, the access panels are closed to protect the batteries and other components inside the float from water, dirt, debris, etc. When access to the interior of the float is desired, the access panel(s) may be opened. In various embodiments, the access panels may have a variety of configurations or tops, such as a completely removable lid, a hinged lid, a sliding cover, etc. In various embodiments, the access panels are held in place using an adhesive, screws, locks, etc. For simplicity and readability, only two access panels are shown here. An actual prototype of the aircraft includes four access panels per float.

The headrest (410) in this example contains a cutout. For context, the pilot's head when seated is shown with a dotted circle (412) and as shown the cutout is located above the expected position of the pilot's head. The cutout in the headrest reduces the drag when the multicopter is flying forward because it permits airflow through the cutout while still protecting the pilot should the multicopter flip over. In contrast, air cannot pass through a solid headrest (see, e.g., FIG. 3) when the multicopter is flying forward which will result in higher drag or wind resistance.

Putting the batteries and electronics (e.g., rotor controller for each rotor) in the floats also shortens the electrical lines running between the batteries and electronics in the float and the rotors which they power and control. Shorter lines mean less power loss (e.g., for the shorter power lines running from the batteries) and better control of the rotors (e.g., for the shorter control lines running from the rotor controllers).

To meet the needs of the exemplary multicopter described above, in various embodiments, the floats include a variety of features and/or components to meet a variety of design considerations relating to (as an example): water (e.g., the floats need to be buoyant, prevent water (vapor) intrusion, detect water (vapor) intrusion, and/or remove water (vapor) from inside the float, etc.), aerodynamics (e.g., as described above, the floats have a certain shape given the rotors mounted to the top of the floats, as well as the vertical takeoff and landing mode and forward flight mode), the batteries stored in the floats (e.g., the floats should sufficiently dissipate heat and/or fumes during normal operation as well as during a battery failure), structural considerations (e.g., the floats need to be able to support the entire weight of the multicopter in case the multicopter lands on solid ground, designing the floats in case of a crash or hard landing, etc.), and so on. The following figures describe some float embodiments to address these design considerations. For simplicity and ease of explanation, the float embodiments are grouped by a specific design consideration (see, e.g., the list above). Naturally, a float embodiment may include any combination of features and/or components even though that combination may not explicitly be described herein.

Figure 5:
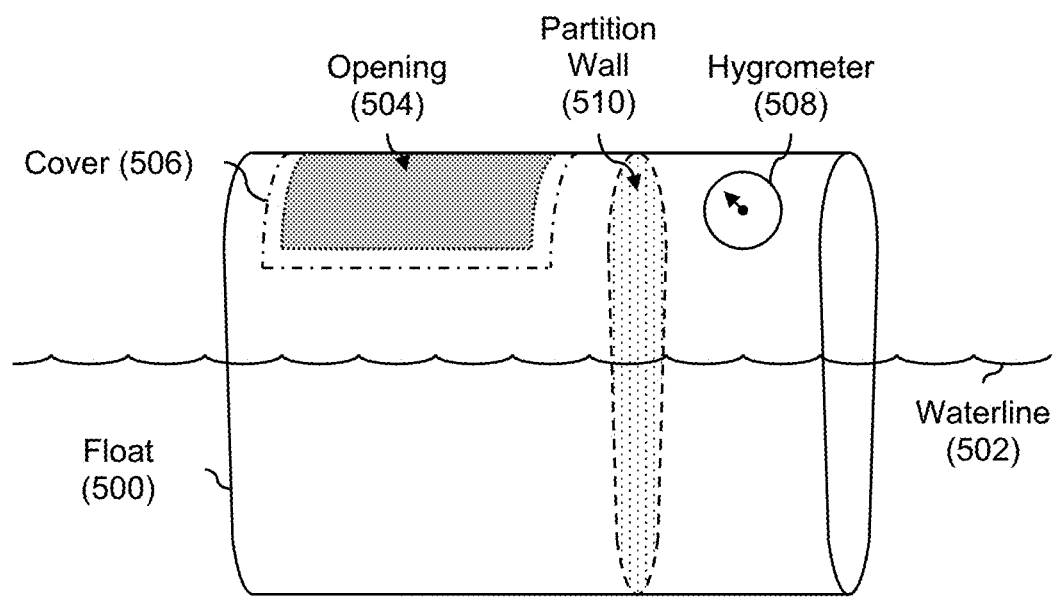
FIG. 5 is a diagram illustrating an embodiment of a float with an access panel, a hygrometer, and a partition wall.

FIG. 5 is a diagram illustrating an embodiment of a float with an access panel, a hygrometer, and a partition wall. In this example, features which prevent water (vapor) intrusion and help to identify when there is too much water (vapor) inside the float are described. In the example shown, the float (500) is partially submerged with the waterline (502) shown. Naturally, the bottom portion of the float (e.g., the submerged part) may be watertight up to at least the waterline (502) and possibly higher. For simplicity, only the float is shown and other parts of the multicopter are not shown.

As described above, to mitigate water intrusion through an access panel, the access panel is located at the top of the float (e.g., facing upward) well above the waterline. In this example, the access panel includes an opening (504) and a cover (506) which is larger than the opening and fits over the cover. In some embodiments, the cover is sealed over the opening using an externally-applied adhesive, such as a waterproof tape. In various embodiments, the cover may be separable from the float (e.g., there is no hinge about which the cover swings open). Alternatively, the cover may be attached to the float (e.g., using a hinge).

In this example, the float includes a hygrometer (508) to measure the amount of water vapor inside the float. The pilot may periodically check the hygrometer (e.g., before and/or after a flight) to ensure the interior of the float is sufficiently dry. In this example, the hygrometer has an analog display and does not require a power supply, which may be desirable because the hygrometer will not consume power (e.g., which reduces flight range in an all-electric aircraft) and can be read even if the battery or aircraft is off. Alternatively, more sophisticated hygrometers (e.g., with a digital output and which require a power supply) which are coupled to some warning system and/or water vapor removal system may be used depending upon the application and/or design constraints (e.g., more sophisticated, heavier, and/or power hungry hygrometers may be acceptable in heavier, more luxurious aircraft).

To maintain buoyancy and/or protect the batteries and electronics in the float, the float (in this example at least) contains a partition wall (510) in the event water enters the float (e.g., because of a puncture or hole in the float beneath the waterline). Any water which enters the float would be confined to a single interior section instead of filling the entire float. This would also help to protect batteries and electronics in the other interior section(s) that do not have water. Naturally, the float may include multiple walls so that the float can be divided up into more interior sections. For example, in FIG. 4, there might be four partition walls so that there is a divider between each of the five batteries (402) shown there.

In some embodiments, the partition walls are constructed using materials with desired properties and characteristics. For example, in the event of a battery failure, a failing battery may emit large amounts of heat. To prevent cascading battery failures (e.g., where the immense heat from one failing battery causes a neighboring battery to fail), in some embodiments, the partition walls include heat resistant materials (e.g., in the form of a heat resistant paint, fabric, etc.). A variety of waterproofing techniques and/or materials may be used to ensure that the partition walls are watertight. In one example, the waterproofing material is sandwiched between the heat resistant materials (e.g., so that a battery failure will not cause the waterproofing to fail, which in turn would cause water intrusion into a neighboring section). In some embodiments, the partition walls include an energy absorbing material in the event of a crash or hard landing. As with the waterproofing material, in some embodiments, the energy absorbing material is sandwiched between two layers of heat resistant material. For example, this would help to protect the energy absorbing material in case a fire or other large release of heat occurs first, followed by a crash (e.g., where the energy absorbing material should have retained its integrity to be useful during the crash). In some embodiments, a partition wall also contains structure to distribute normal landing loads and reduce the weight of the float side wall structure.

A variety of techniques may be used to ensure that a float with the features or components shown still has a smooth external surface which produces good laminar airflow. For example, taping the cover over the opening ensures a smooth surface in that region of the float. To ensure a smooth surface where the hygrometer is located, the hygrometer may have a smooth, clear faceplate which is flush or level with the rest of the float; any gaps between the hygrometer and the rest of the float may be filled with a waterproof and flexible adhesive.

Figure 6:
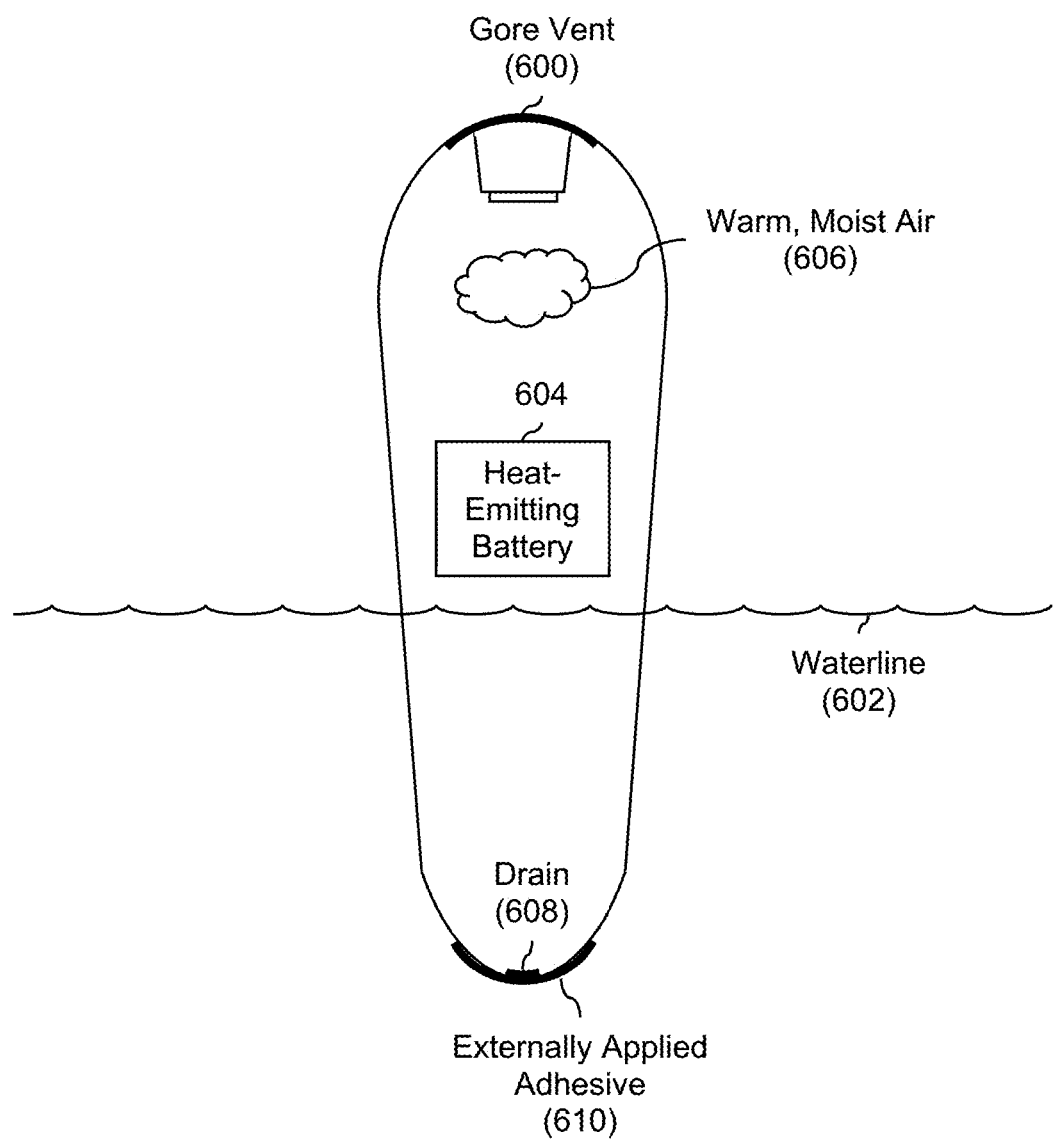
FIG. 6 is a diagram illustrating an embodiment of a float with a gore vent and a drain hole.

FIG. 6 is a diagram illustrating an embodiment of a float with a gore vent and a drain hole. In the example shown, a variety of techniques for removing water in liquid and vapor form are described. A gore vent (600) is used to passively permit water vapor to leave the interior of the float while preventing water drops from entering the float. Since the gore vent is not water tight and therefore cannot be submerged, the gore vent is located well above the waterline (602). Putting the gore vent at the top of the float is also helpful because the batteries (604) inside the float produce heat. This causes warm, moist air (606) to rise and the gore vent's location at the top of the float permits the water vapor in the warm air to exit the float. From this view, only a single gore vent is shown but naturally a float may include any number and/or arrangement of gore vents.

For larger amounts of water, the exemplary drain at the bottom of the float may be used. In this example, the drain (608) is sealed or plugged in a manner that satisfies two design constraints: the drain is watertight and the exterior surface of the float is smooth (e.g., because a protruding part on the bottom of the float could get scraped off and/or produce laminar airflow). In one example, the drain hole is blocked using a drain cover which is screwed into place. For example, the drain cover may include a cylindrical, plug-like portion which is inserted snugly into the drain hole. The exemplary drain cover also includes a relatively flat piece attached to one end of the plug portion where the flat piece has holes for screws to pass through. Screws are inserted (e.g., through the holes in the drain cover) into screw holes located on the bottom of the float. In this example, once the drain cover is screwed into place, the drain cover is then covered by an externally applied adhesive (610), such as a waterproof tape. This helps to further prevent water intrusion via the drain.

In some embodiments, the externally applied adhesive (610) may also have other desirable properties to assist with other design objectives. For example, since the multicopter may also land on solid ground, the adhesive may be "grippy" (e.g., have a high coefficient of static friction) so as to mitigate any slipping on a smooth and/or tilted surface. In applications where the multicopter will take off and land from solid ground relatively frequently (thus putting a lot of wear and tear on the bottom of the float), the ability to easily and/or inexpensively replace the externally applied adhesive on the bottom of the float is also desirable. For example, if the externally applied adhesive is tape and gets scraped up, the old tape can be taken off and new tape can be put on the bottom of the float. This also protects the (e.g., composite) bottom of the float.

Although a passive drain is shown here (e.g., where the multicopter would need to be out of the water in order to drain water via the drain hole), in some embodiments an active water removal system is used (e.g., which can be used even when the multicopter is in the water). For example, a pump may be used. Depending upon the application, the appropriate components may be selected. For example, for (ultra) lightweight aircraft where weight is an important consideration, a drain may be preferred over a heavier pump.

In some cases, the battery (604) may fail and release a large amount of heat and/or fumes. The gore vent (600) is also useful in releasing the fumes from a failing battery, where the fumes may be hot and/or toxic. In some embodiments, to help any such fumes escape the float, each battery has a gore vent directly above it. Although an active component such as a pump or fan may be faster at removing fumes from the float, the additional weight may make active components unattractive compared to passive components such as a gore vent. In some embodiments, some other component which drains gases even faster is used (e.g., an active and/or heat-activated vent).

In some embodiments, a thermometer is used to track and/or measure the temperature of the battery (604). For example, each battery in FIG. 4 may have a built-in digital thermometer (e.g., in the same can or package as the battery cells) or an external one located on a nearby printed circuit board (e.g., with other electronics). In some embodiments, in the event a temperature threshold is exceeded, the thermometer signals to a flight computer or flight controller that a particular battery has failed and that landing should be initiated.

In some embodiments, a thermometer is used which does not require a power supply, measures the internal temperature of the float, and has an analog display which is visible from the outside of the float. Similar to the analog, non-electric hygrometer 508 in FIG. 5, such a thermometer could be read even when the aircraft or battery is off and would not consume power (which would reduce the flight range of the all-electric aircraft).

In some embodiments, a float includes features or components to dissipate heat emitted by the batteries. The following figure shows an example of some such float features and/or components.

Figure 7:
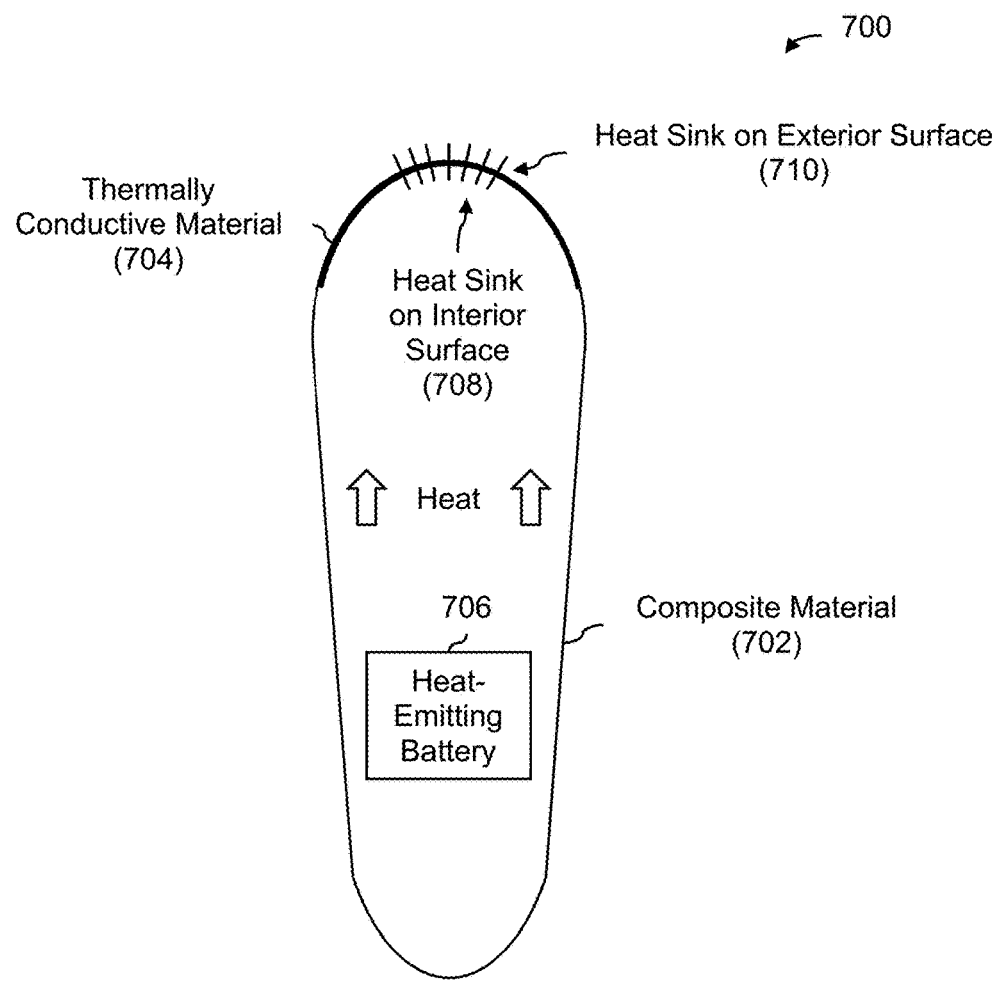
FIG. 7 is a diagram illustrating an embodiment of a float which includes a thermally conductive material and a heat sink at the top of the float.
Figure 7:
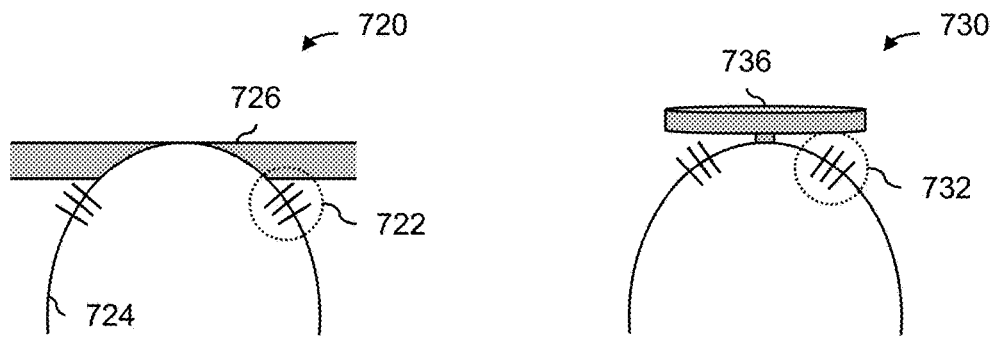

FIG. 7 is a diagram illustrating an embodiment of a float which includes a thermally conductive material and a heat sink at the top of the float. In this example, diagram 700 shows a general arrangement where the float is made up of two different materials at different parts of the float. The sidewalls and bottom of the float in this example are made of a composite material (702). Generally speaking, the floats tend to be relatively narrow, relatively deep, and relatively tall (e.g., when viewed from the front, as shown here). Composites are relatively lightweight and are able to form such a float shape (e.g., in contrast, an inflatable float would tend to be heavier and would not be able to achieve such a shape).

The top of the float is made up (at least in part) of a thermally conductive material (704) which is a better conductor of heat than the composite material. In some embodiments, a metal is used. The heat from the batteries (706) will rise to the top of the float. Since the top part of the float is made of a (good) thermally conductive material, the heat from the batteries will be better able to exit the float (e.g., than if all of the float were made of a composite material). Referring briefly back to FIG. 4, in some embodiments, the access panels (406) are made of metal and the rest of the float (400) is made of composite. Alternatively, the top portion of the float is made (e.g., entirely) of a material which is a good thermal conductor.

Turning back to FIG. 7, to further assist with heat dissipation, this example float also includes heat sinks (in this example in the shape of fins) disposed along the interior surface of the top of the float (708) as well as on the exterior surface of the top of the float (710). Although this example shows heat sinks on the interior surface as well as the exterior surface of the float, in some embodiments heat sinks are located on only one of those surfaces (e.g., so that the exterior surface is smooth to prevent injury and/or to mitigate chaotic airflow).

Diagrams 720 and 730 show some examples of where a heat sink may be placed to minimize injuries and/or burns from a heat sink. In diagram 720, the heat sinks (722) are placed positioned on the float (724) beneath the boom (726) of the multicopter. In this location, the heat sinks are shielded or otherwise blocked by the boom hanging over the heat sink, reducing the likelihood of someone (e.g., accidentally) touching or stepping on the heat sink. This can prevent cuts, bruises, or burns from the heat sink.

Diagram 730 shows another arrangement where the heat sinks (732) are shielded or otherwise blocked by one of the rotor's circular center portions (736). (More generally, part of the rotor acts as a blocking object). Because the heat sinks are located beneath the center portions (as opposed to further away from the axis of rotation), the heat sinks will always be shielded by the centers of the rotors, no matter what angle the rotor is at (e.g., where the blades are pointing) when the rotor is off.

For clarity, the terms shielded and blocked are more formally defined to mean that (e.g., the view of) the heat sink is at least partially obstructed by the blocking object (e.g., an boom (726) or a rotor's circular center portions (736)) when viewed from above (e.g., a birds eye view).

The heat sink positions shown here in diagram 720 and 730 are merely exemplary and are not intended to be limiting. The manner in which booms, rotors, floats, and other multicopter parts are connected together in this region are design specific and heat sink placement may be adapted to the particular implementation.

In some embodiments, a float includes features or components associated with crash energy absorption. Since the floats are the lowest part of the multicopter (at least with the example arrangement described above; see FIG. 3), the floats will be the first part of the multicopter to hit the ground in the event of a hard landing or crash.

Figure 8:
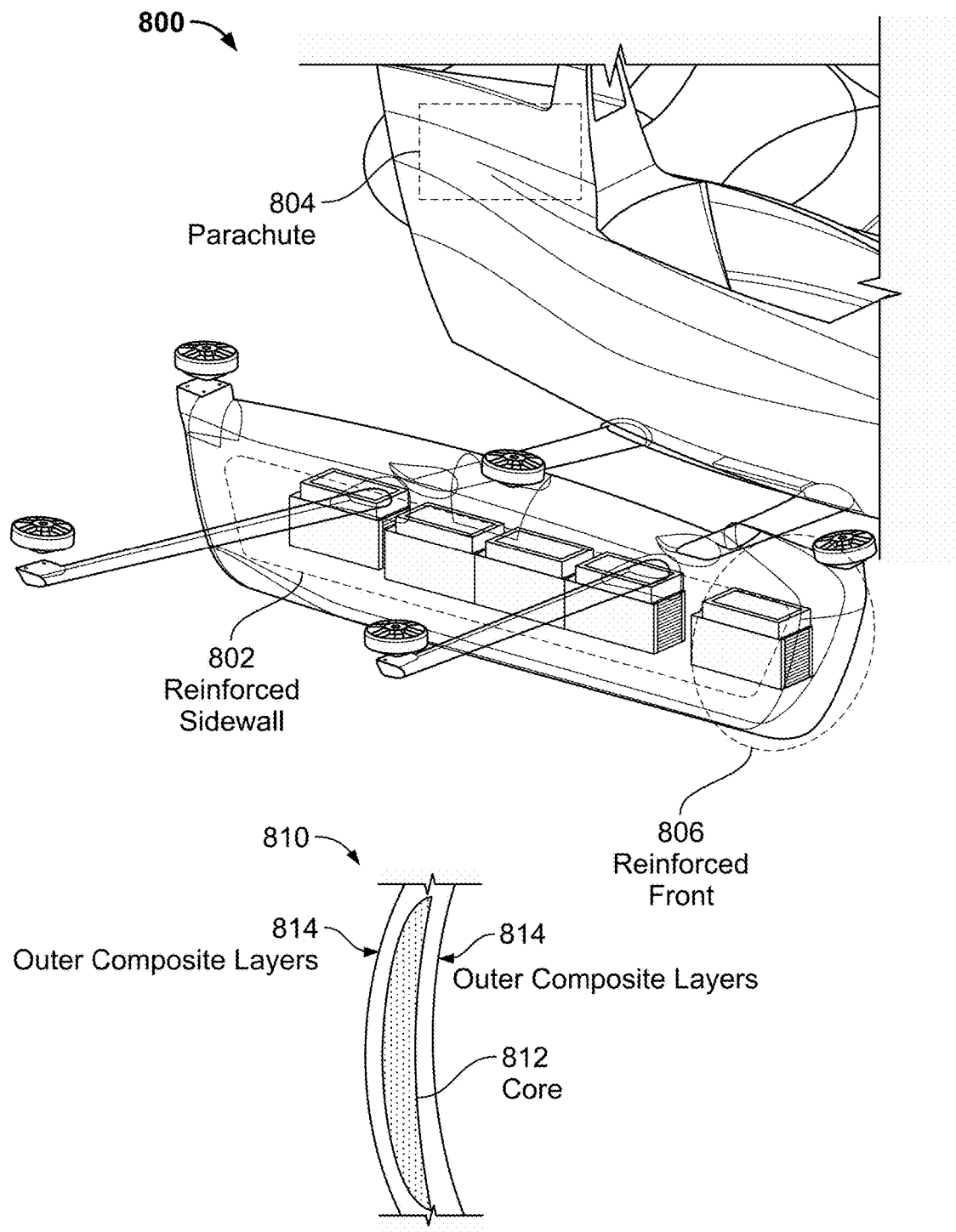
FIG. 8 is a diagram illustrating an embodiment of a float with a reinforced sidewall and a reinforced front.

FIG. 8 is a diagram illustrating an embodiment of a float with a reinforced sidewall and a reinforced front. As described above, the exemplary multicopter is adaptable to a variety of takeoff and/or landing surfaces, including solid ground. Diagram 300 in FIG. 3 shows a front view of the multicopter and from that front view it is apparent that the floats (but not the fuselage) will be the only part of the aircraft touching the ground and therefore the floats have to bear the entire weight of the multicopter when on land.

To ensure that the floats are able to support the entire weight of the multicopter when on land, the sidewalls of the multicopter are reinforced in this example. In diagram 800, the indicated part of the sidewall is reinforced using sandwich-structured composite. Diagram 810 shows a cross section of the sidewall of the float which includes sandwich-structured composite. As shown there, a core (812) is surrounded by two outer composite layers (814) so that the sidewalls of the float are better able to support the weight of the multicopter when on land. In some embodiments, the material used in the core is (also) selected for its energy absorption properties in case a hard landing or crash occurs. To preserve the readability of diagram 800, only one reinforced sidewall (802) is shown in diagram 800 but naturally both sidewalls of a float may be reinforced using sandwich-structured composite or some other reinforcing technique and/or material.

In this example, the multicopter also includes a parachute (804) which is stowed in the fuselage behind the seat (or, more generally, in the back half of the fuselage). The parachute is anchored to the fuselage at some point behind the seat. Since the center of mass is roughly near the center of the fuselage, the multicopter will tilt forward when descending if the parachute is deployed. This means that the front of the floats (as well as the front of the fuselage) will come into contact with the ground first when the multicopter lands. To better absorb crash energy if this happens, the fronts (806) of the floats (e.g., the bow) are reinforced, for example by putting crash energy absorbing materials inside the float at the front. The crash energy absorbing materials may be molded or otherwise shaped to fit or follow the interior surface of the float at the front and/or to fit or follow the shape of the front battery.

Typically, crash energy absorbing materials are denser than air and so for buoyancy reasons, crash energy absorbing materials are distributed sparingly and/or thoughtfully throughout the interior of the float. For example, if all of the free space in the float (e.g., other than the space occupied by the batteries, electronics, etc.) were filled with crash energy absorbing materials, the floats would probably sink. However, putting some crash energy absorbing materials at the front of the floats makes sense since the multicopter will tilt forward if the parachute is deployed.

In some embodiments, the parachute is attached to the multicopter at a different anchor point and therefore a different part of the float is reinforced. For example, some other multicopters may have more room at the front of the fuselage to put the parachute. Also, by making the anchor point at the front of the fuselage, the multicopter will tilt backward when the parachute is deployed and the pilot will be recumbent when landing. This may be a more desirable crash landing positing (e.g., compared to leaning forward) because the headrest and backrest may prevent whiplash and/or a recumbent position may better protect the pilot's spinal column (e.g., compared to sitting straight up). In such embodiments where the parachute is anchored to the front of the fuselage, the rear part of the floats (e.g., the stern) may be reinforced since that part of the floats will hit the ground first.

In some embodiments, a float includes crush structures which support the batteries in the floats. The following figure shows some examples of this.

Figure 9:
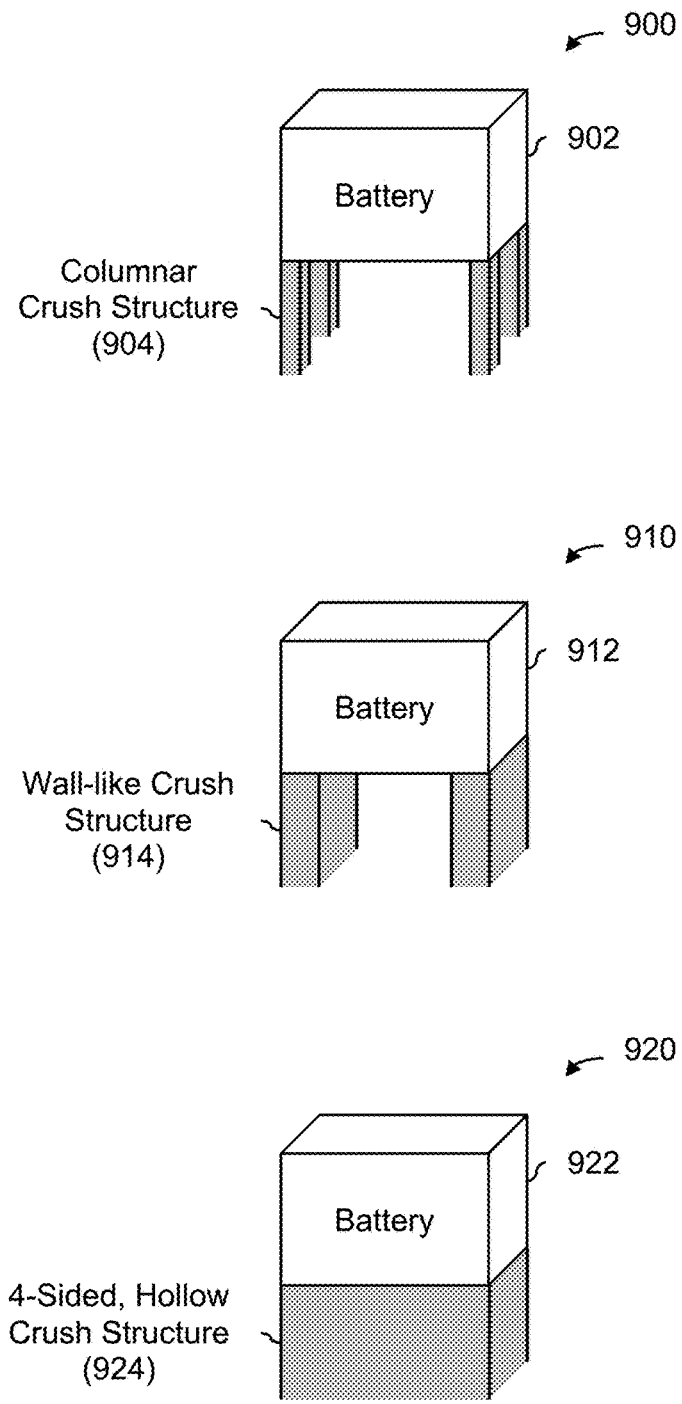
FIG. 9 is a diagram illustrating some embodiments of crush structures which are used to support the batteries.

FIG. 9 is a diagram illustrating some embodiments of crush structures which are used to support the batteries. In this figure, the exemplary crush structures satisfy a number of functions. First, the crush structures elevate the battery within the float. If water enters the float, the crush structures will keep the batteries out of any water gathering at the bottom of the float. An elevated battery within the float also improves accessibility. See, for example, FIG. 4 where the access panels (406) are located at the top of the float. By raising the batteries, the batteries can more easily be accessed via the access panels (e.g., to replace the batteries and/or perform maintenance checks). In the event of a crash, the crush structures also act to absorb crash energy to make the crash safer for the pilot.

Diagram 900 shows an example of a battery (902) which is supported by four columnar crush structures (904) at the corners of the battery. Diagram 910 shows an example of a battery (912) which is supported by two wall-like crush structures (914) at two edges of the battery. Diagram 920 shows an example of a battery (922) which is supported by a four-sided, hollow crush structure (924) which follows the edge or perimeter of the battery (i.e., they have the same footprint). As described above, some energy absorbing materials are denser than air which is bad for buoyancy. For this reason, at least some of the space beneath the battery is empty or hollow in all of these examples and is not completely filed with energy absorbing materials.

The bottom of the floats are rounded and the bottoms of the exemplary crush structures shown here may be adapted to the round float bottoms using a variety of techniques. In some embodiments, an adhesive is used to secure the bottoms of the crush structures to the bottom interior surface of the floats. In some embodiments, the crush structures have a U or bowl shaped bottom which fits or follows the bottom interior surface of the floats. For example, in diagram 910, the left wall-like crush structure may be connected to the right wall-like crush structure using a U-shaped bottom (not shown) which is also made of energy absorbing material. Or, in diagram 920, the hollow structure shown there may have a bowl-like bottom (not shown).

In some embodiments, the crush structures include component(s) and/or are shaped to aid in the proper insertion or securing of the battery to the crush structure. For example, the crush structure may have a slightly larger footprint than the battery and include a cutout in which the battery sits so the crush structure has a "lip" around the bottom of the battery when the battery is resting on the crush structure. Or, the crush structure base may have any number of L-shaped brackets or braces to properly position and/or secure the battery. These are some examples and are not intended to be limiting.

In some embodiments, the floats include a removable bottom portion. The following figure shows an example of this.

Figure 10:
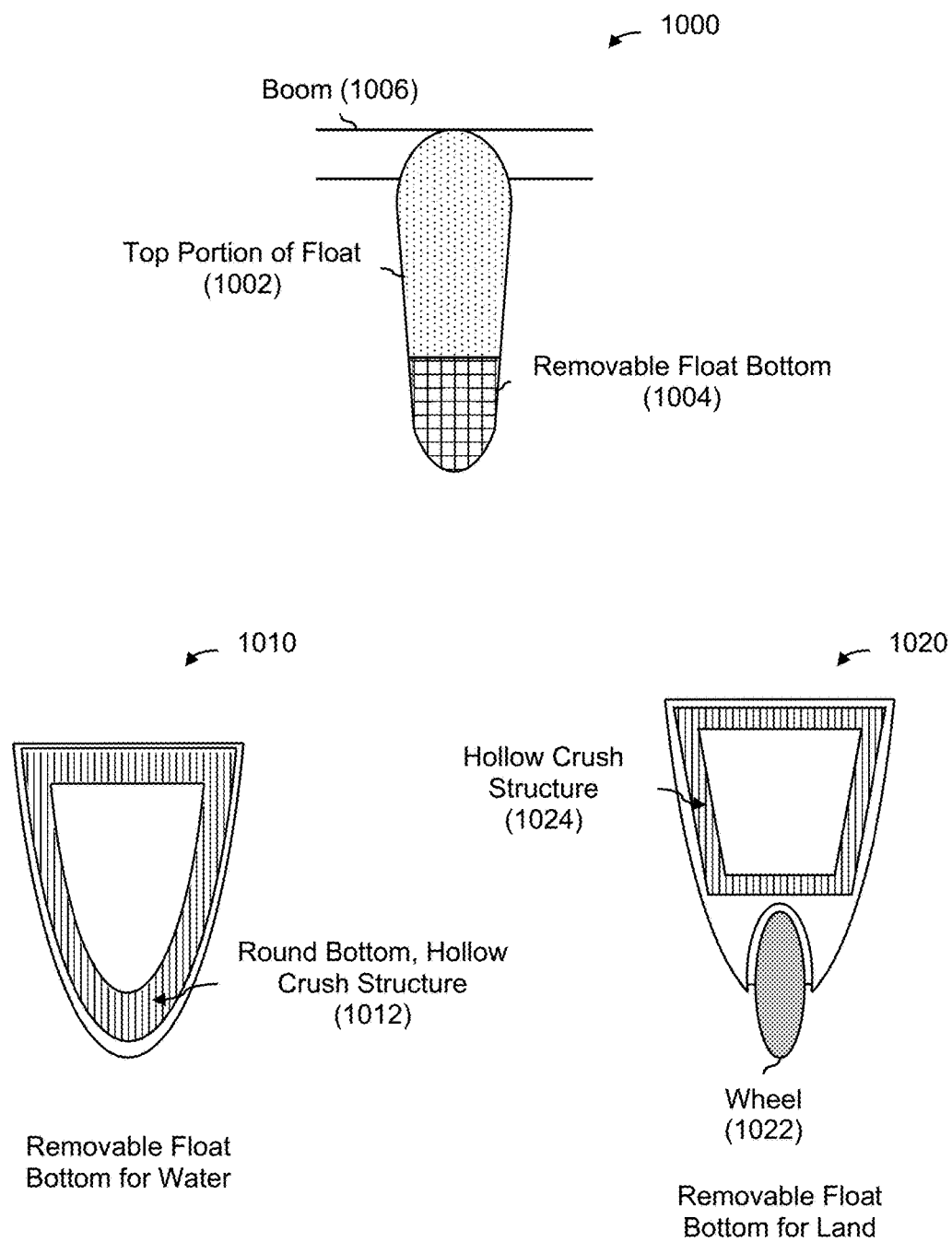
FIG. 10 is a diagram illustrating some embodiments of a float with a removable bottom.

FIG. 10 is a diagram illustrating some embodiments of a float with a removable bottom. Diagram 1000 shows an example of the general concept. In this example, the float is divided up into two portions which can be removably connected to each other: a top portion (1002) and a removable bottom portion (1004).

The top portion of the float (1002) is connected to the rest of the multicopter via the boom (1006) and includes the batteries and other electrical components (not shown). For example, the batteries and electronics are stored there because they may be more accessible and better protected in the top portion. They also tend to be relatively expensive so it makes more sense to have only one set of batteries and components (e.g., in the float's top half) instead of different sets of batteries and components for each removable float bottom.

Having a removable bottom is attractive for a number of reasons. For one thing, the bottom of the floats will tend to be the most damaged or worn part of the float. By having an easily removable bottom, the damaged or worn part of the float can be easily and/or inexpensively repaired. For example, the owner of the multicopter could order a replacement bottom and replace it at home instead of having to take the entire multicopter in to a service center where the entire float would need to be detached from the boom (1006) using special equipment. Also, since only the bottom is replaced instead of the entire float (e.g., shell), the replacement part is less expensive.

Having a removable bottom also enables the multicopter to swap in or out different float bottoms depending upon the takeoff and landing surface. Diagram 1010 shows an example of a removable float bottom which is adapted for water. In that diagram, the bottom includes a round bottom, hollow crush structure (1012) inside the float bottom. The battery and electronics are located in the top portion of the float and are therefore not shown here (e.g., since it would be expensive to have a different set of batteries and electronics for each removable bottom which is adapted for a different landing surface). Depending upon where the multicopter is intended to be used (e.g., over land or over water), the appropriate float bottom can be attached to the multicopter.

Diagram 1020 shows an example of a removable bottom which is adapted for land. In this example, there is a wheel (1022) at the bottom with a hollow crush structure (1024) above it. Although buoyancy in the water is not a consideration, weight is still a consideration and so a hollow crush structure is still used. Other landing gear related components may also be included, such as brakes, shocks, actuators for extending/retracting the wheel, etc.

Any appropriate fastener may be used to removably attach a bottom portion of the float to the top portion. In some embodiments, the removable bottom portion of the float may be removed or attached using commonly available household tools and/or fasteners so that someone at home can swap in or out a removable float bottom (e.g., hexagonal wrenches, cordless drills with a Phillips drill bit tip, etc.).

Although not necessarily shown here, having a removable bottom also permits float bottom designs that are more specifically adapted for a particular surface. Instead of having to compromise between conflicting design considerations (e.g., creating an all-purpose float designed for both land and water), designs or features which are optimized for one particular landing surface may be used. For example, note that the all-purpose designs shown in FIG. 3 and FIG. 4 have a rounded float bottom which can land on both water and land. As an example of a specialized designed feature, the removable float bottom which is designed for water (1010) may be less rounded and more "pointy" to better pierce the water when landing. A "pointy" float bottom would not work on land but with differentiated or specialized float bottoms, this is possible.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a float which has a front-to-back length, a width, and a height, wherein:
the float is included in an aircraft;
the front-to-back length of the float is strictly greater than the height of the float which in turn is strictly greater than the width of the float;
at least a bottom portion of the float is watertight;
the float includes an access panel to access the inside of the float;
the float includes a removable and interchangeable float bottom adapted for at least one of: water and land, the land float bottom including a wheel; and
a battery, wherein the battery is inside the float and is accessible via the access panel.

2. The system recited in claim 1, wherein the aircraft includes a plurality of rotors which are attached to the aircraft at a fixed roll angle and a fixed pitch angle.

3. The system recited in claim 1, wherein:
the aircraft includes a plurality of rotors which are attached to the aircraft at a fixed roll angle and a fixed pitch angle; and
the plurality of rotors include:
a right inner front rotor which is configured to rotate in a first direction;
a right outer front rotor which is configured to rotate in the first direction;
a right inner middle rotor which is configured to rotate in a second direction;
a right outer back rotor which is configured to rotate in the second direction;
a right inner back rotor which is configured to rotate in the first direction;
a left inner back rotor which is configured to rotate in the second direction;
a left outer back rotor which is configured to rotate in the first direction;
a left inner middle rotor which is configured to rotate in the first direction;
a left outer front rotor which is configured to rotate in the second direction; and
a left inner front rotor which is configured to rotate in the second direction.

4. The system recited in claim 1, wherein:
the aircraft includes a plurality of rotors which are attached to the aircraft at a fixed roll angle and a fixed pitch angle;
the plurality of rotors include:
a right outer front rotor which is attached to the aircraft at a negative roll angle and a negative pitch angle;
a right inner middle rotor which is attached to the aircraft at a negative roll angle and a negative pitch angle;
a right outer back rotor which is attached to the aircraft at a negative roll angle and a negative pitch angle;
a right inner back rotor which is attached to the aircraft at a negative roll angle and a negative pitch angle;
a left inner back rotor which is attached to the aircraft at a positive roll angle and a negative pitch angle;
a left outer back rotor which is attached to the aircraft at a positive roll angle and a negative pitch angle;
a left inner middle rotor which is attached to the aircraft at a positive roll angle and a negative pitch angle; and
a left outer front rotor which is attached to the aircraft at a positive roll angle and a negative pitch angle; and the plurality of rotors are attached to the aircraft at roll angles and pitch angles with magnitudes in the range of 0 degrees and 10 degrees.

5. The system recited in claim 1 further including at least one of a gore vent and a drain.

6. The system recited in claim 1 further including a heat sink, wherein a view of the heat sink is at least partially obstructed by a blocking object when viewed from above.

7. The system recited in claim 1 further including a heat sink, wherein a view of the heat sink is at least partially obstructed by a blocking object when viewed from above, wherein the blocking object includes one or more of the following: a boom or a rotor.

8. The system recited in claim 1, wherein the float further includes a sidewall with sandwich-structure composite.

9. The system recited in claim 1, wherein:
the aircraft further includes a parachute and a fuselage, where the parachute is attached to an anchor point in a back half of the fuselage; and
the float includes energy absorbing material inside the float at a front portion.

10. The system recited in claim 1 further including a crush structure inside the float which supports the battery.

* * * * *